United States Patent
Sheehy et al.

(10) Patent No.: US 10,030,514 B2
(45) Date of Patent: Jul. 24, 2018

(54) METHOD OF MONITORING THE FLOW OF NATURAL OR INJECTED WATER DURING OIL FIELD RECOVERY PROCESSES USING AN ORGANIC TRACER

(71) Applicant: TITAN OIL RECOVERY, INC., Beverly Hills, CA (US)

(72) Inventors: Alan James Sheehy, Minyama (AU); Brian W. G. Marcotte, Rolling Hills, CA (US); Michael Thomas Carroll, Glendora, CA (US); Colin Kenneth Hill, San Dimas, CA (US)

(73) Assignee: TITAN OIL RECOVERY, INC., Beverly Hills, CA (US)

( * ) Notice: Subject to any disclaimer, the term of this patent is extended or adjusted under 35 U.S.C. 154(b) by 706 days.

(21) Appl. No.: 14/147,355

(22) Filed: Jan. 3, 2014

(65) Prior Publication Data

US 2014/0182840 A1    Jul. 3, 2014

Related U.S. Application Data

(60) Provisional application No. 61/748,600, filed on Jan. 3, 2013.

(51) Int. Cl.
*C09K 8/582* (2006.01)
*E21B 49/08* (2006.01)

(52) U.S. Cl.
CPC .......... *E21B 49/088* (2013.01); *C09K 8/582* (2013.01)

(58) Field of Classification Search
CPC .......... E21B 43/22; E21B 49/08; C09K 8/58; C12Q 1/04

USPC ............................................ 166/246, 250.12
See application file for complete search history.

(56) References Cited

U.S. PATENT DOCUMENTS

| | | | |
|---|---|---|---|
| 4,905,761 A | 3/1990 | Bryant | |
| 5,083,610 A | 1/1992 | Sheehy | |
| 5,083,611 A * | 1/1992 | Clark et al. | 166/246 |
| 5,163,510 A * | 11/1992 | Sunde | 166/246 |

(Continued)

FOREIGN PATENT DOCUMENTS

| | | |
|---|---|---|
| EP | 2622175 | 4/2012 |
| WO | WO1989/10463 | 11/1989 |
| WO | 2012/050794 A1 | 4/2012 |

OTHER PUBLICATIONS

Harvey et al. Encyclopedia of Environmental Microbiology. "Tracers in Groundwater: use of microorganisms and microshperes" (2002).*

(Continued)

*Primary Examiner* — William D Hutton, Jr.
*Assistant Examiner* — Avi T Skaist
(74) *Attorney, Agent, or Firm* — Zarley Law Firm, P.L.C.

(57) ABSTRACT

A method of monitoring fluid flow in an oil reservoir includes the step of delivering a nutrient package to an oil reservoir. The nutrient package stimulates the growth of resident microbes/organisms which changes the morphology and function of the microbes. A sample is taken from produced fluids from wells in the reservoir and possible connections thereof and analyzed. Based on the analysis, determinations are made regarding the movement of fluids in the reservoir by observing changes in the range, concentration, and cell morphology of the microbes after nutrient stimulation by comparing pre-treatment versus post treatment measurements.

14 Claims, 2 Drawing Sheets

(56) References Cited

U.S. PATENT DOCUMENTS

| | | | |
|---|---|---|---|
| 5,368,099 A | | 11/1994 | Davey et al. |
| 5,807,697 A | * | 9/1998 | Strong-Gunderson et al. ............................. 435/29 |
| 6,645,769 B2 | | 11/2003 | Tayebi et al. |
| 6,691,783 B1 | | 2/2004 | Bulla, Jr. et al. |
| 6,758,270 B1 | | 7/2004 | Sunde et al. |
| 7,124,817 B1 | | 10/2006 | Sunde |
| 8,316,933 B2 | | 11/2012 | Kohr |
| 2001/0036667 A1 | | 11/2001 | Tayebi et al. |
| 2001/0045279 A1 | | 11/2001 | Converse et al. |
| 2009/0029879 A1 | * | 1/2009 | Soni et al. .................... 507/201 |
| 2010/0015612 A1 | * | 1/2010 | Pelham et al. .................... 435/6 |
| 2012/0241148 A1 | * | 9/2012 | Alsop et al. .................. 166/246 |
| 2012/0261117 A1 | | 10/2012 | Pavia et al. |
| 2014/0182840 A1 | | 7/2014 | Sheehy et al. |

OTHER PUBLICATIONS

European Extended Search Report, "Communication of the Extended Search Report and Search Opinion" by the European Patent Office in Munich, Germany, for European Application No. 14896302.8, dated Nov. 14, 2017, 8 pages.

\* cited by examiner

METHOD OF MONITORING THE FLOW OF NATURAL OR INJECTED WATER DURING OIL FIELD RECOVERY PROCESSES USING AN ORGANIC TRACER

CROSS REFERENCE TO RELATED APPLICATION

This application claims the benefit of U.S. Provisional Application No. 61/748,600 filed Jan. 3, 2013.

BACKGROUND OF THE INVENTION

This invention relates to the monitoring of oil field recovery processes. More specifically, this invention relates to utilizing the stimulation of specific resident microorganisms through the injection of nutrients in oil field reservoirs to monitor the movement and flow patterns of natural or injected fluids in producing oil field reservoirs and possible connections thereof. The technique is beneficial in the optimization of oil field operations, especially oil recovery projects.

An area of oil field technology is designed to monitor the direction, pattern and rate of fluid movement in a producing oil field reservoir as part of the oil recovery process. Today the industry monitors fluid flow in reservoirs through the use of chemical or radioactive tracers and requires the compositional analysis of produced fluids with tracer concentrations in the range of parts per million or even parts per billion. Due to the very low concentrations of such tracers the result of measurement creates uncertainty if no tracer material is found to be present in the produced water. To increase the concentration is typically cost prohibitive. The use of resident microorganisms stimulated by a source of nutrients injected into the reservoir is discernible with microbiological laboratory techniques even in distant locations. The outcome is a unique biological, organic method to monitor the flow of injected fluids in an oil reservoir.

Therefore, for the reasons stated above, and for other reasons stated below, which will become apparent to those skilled in the art upon reading and understanding the specification, and the drawings, there is a need in the art for a method of monitoring the flow of natural or injected water during oil field recovery processes using an organic tracer.

Thus, it is a primary object of the invention to provide a method of monitoring the flow of natural or injected water during oil field recovery processes using an organic tracer that improves upon the state of the art.

Another objective of the present invention is to provide a method that uses microbiological stimulation of resident microbes as a way to trace fluid movement in a reservoir.

A further objective of the present invention is to provide a method of tracing fluid movement in a reservoir that is more cost effective.

A still further objective of the present invention is to provide a method of tracing fluid movement in a reservoir that is effective at distant locations from the point of injection.

These and other objectives will be apparent to one of ordinary skill in the art based upon the following written description.

SUMMARY OF THE INVENTION

A method of monitoring fluid flow in an oil reservoir includes the step of delivering a nutrient package to an oil reservoir. The nutrient package stimulates the growth of resident microbes/organisms which changes the morphology and function of the microbes in a definitive way. A sample is taken from produced fluids from wells in the reservoir and possible connection thereof and analyzed. Based on the analysis, determinations are made regarding the movement of fluids in the reservoir by observing changes in the range, concentration, and cell morphology of the microbes after nutrient stimulation or depletion by comparing pre-treatment versus post treatment measurements.

DETAILED DESCRIPTION OF THE PREFERRED EMBODIMENTS

Figure 1:
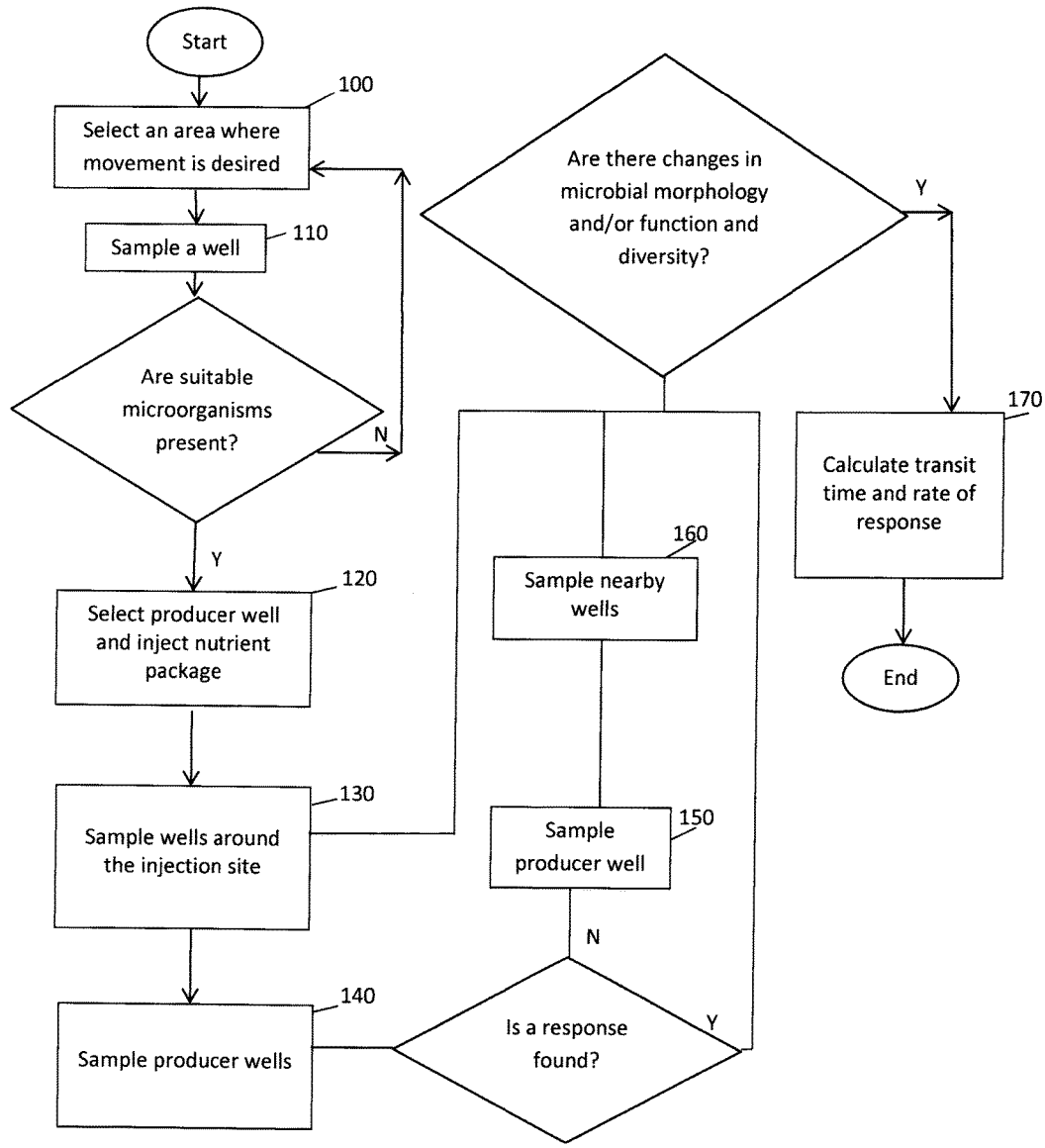
FIG. 1 is a flow diagram of a method of monitoring flow during oil field recovery.

A method is described for monitoring the fluid movement in an oil reservoir including delivering a nutrient package into an oil reservoir well or wells. Through the process of adding certain nutrient materials in the water injection system, the growth and compositional changes in resident microorganisms in producing wells provides a clear indicator of the movement of the injected fluids.

The method can be used in a wide variety of oil field reservoirs where microorganisms reside. In one arrangement, the delivery of the nutrient package occurs via a water injection well to take advantage of water flood processes associated with secondary or tertiary recovery processes where water injection wells are hydraulically connected to producing wells in a given oil field. In another embodiment the delivery of the nutrient package is via a producing well in a natural water drive reservoir.

In another embodiment the delivery of the nutrient package is via a producing well in a natural water drive reservoir. The nutrient package produces growth and changes in morphology and functions that can be detected when samples taken remotely from the point of injection are examined in the lab.

Through the monitoring of changes in resident microorganisms and their metabolites a determination of the direction, volume and velocity of injected fluid flow in the reservoir can be made. For example, the population modifications are monitored as they occur either by the nutrients moving with the reservoir fluids and stimulating growth of resident microorganisms in areas of the reservoir or by the microorganisms physically traveling through the reservoir. The presence of particular microorganisms or a particular attribute in produced fluids is a direct and definitive indicator of the movement or influence of the nutrient package on the producing characteristics of the oil reservoir and traces the physical movement of the fluids in real time through the reservoir. Changes in range, concentration and cell morphology are used to determine fluid flow.

Monitoring occurs by analyzing samples taken from a well and maintained at close to reservoir conditions and/or that provide for optimal microorganism recovery. Preferably the sample is taken at a location remote to the injection site. Both laboratory microscopy and genetic sequencing results are determined. In addition, pre-treatment and post-treatment measurements are compared to aid in the determination of rate, direction and flow pattern within the producing oil field reservoir.

In one example, the method begins at step 100 by selecting an area where movement is desired. At step 110 a well in the reservoir is sampled and the sample is analyzed in the lab for the presence of microbial flora. If suitable microorganisms are present, at step 120 a producer well is selected for the introduction of a nutrient package, also known as the injection site, and the nutrient package is injected. At step 130, wells surrounding the treated well or injection site are sampled to detect changes in microorganisms including morphology and function that is a response to the nutrient package. Also, at step 140, the injector well and nearby producer wells are sampled and analyzed to detect changes in microbial morphology and/or function and diversity produced by the nutrient package.

At step 150, after waiting for a change in oil/water production, the producer well is sampled along with other wells nearby for changes in microbial morphology and/or function and diversity that is a response produced by nutrient package. If no response is found in the producer well, but changes are seen in oil/water production in nearby wells, at step 160, the nearby wells are sampled for microbial morphology and/or function and diversity that is a response produced by nutrient package. Finally, at step 170, based on a reservoir field map, transit time and rate from microorganism response parameters are calculated.

Figure 2:
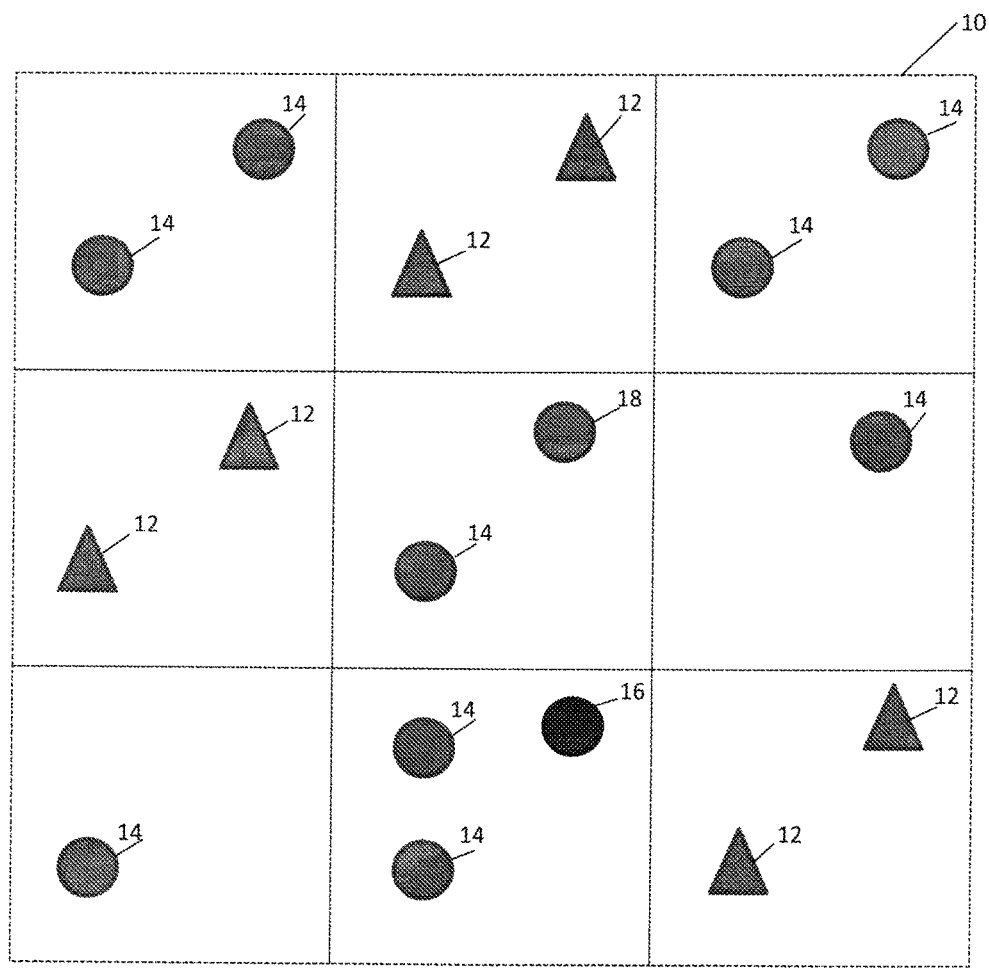
FIG. 2 is a schematic diagram of a reservoir field map.

As a further example, and as shown in FIG. 2, in the model reservoir field map 10 water is normally injected in an injector 12 and moves south and east toward producers 14. To determine where nutrients/water would travel a producer 16 is treated and shut in for several days. Samples are taken, as described above, and after several weeks producer 18 to the north of producer 16 is found to be producing more oil and/or water. Upon sampling producer 18 shows microbial flora consistent with the nutrient package that was introduced to producer 16 showing there is a connection underground between the two producers not known to exist by the geological or production data at the reservoir. From this information, the manner in which the subterranean fluids are traveling can be calculate which can be used to maximize production while minimizing production cost.

From the above discussion, it will be appreciated that a method of monitoring the flow of natural or injected water during oil field recovery processes using an organic tracer that improves upon the state of the art has been presented.

That is, a method of monitoring the flow of natural or injected water during oil field recovery processes using an organic tracer has been presented that quickly and easily traces fluid movement in a reservoir; that is more cost effective; and that is effective at distant locations from the point of injection.

It will be appreciated by those skilled in the art that other various modifications could be made to the methods described herein without parting from the spirit and scope of this invention. All such modifications and changes fall within the scope of the claims and are intended to be covered thereby.

What is claimed is:

1. A method of determining fluid flow in an oil reservoir and connections thereof, comprising the steps of:
   delivering a nutrient package to an oil reservoir;
   permitting the nutrient package to stimulate resident microorganisms causing growth and compositional change to the resident microorganisms;
   taking and analyzing a sample of fluid from wells in the oil reservoir; and
   determining the movement of fluids in the oil reservoir based upon changes in the resident microorganisms.

2. The method of claim 1 wherein the delivering step occurs by injection into a water well.

3. The method of claim 1 wherein the delivering step occurs by injection into a producing well.

4. The method of claim 2 wherein the sample is taken at a well with a location other than from the injection location.

5. The method of claim 1 wherein the movement of fluids is determined based upon a calculation of an amount of change of the resident microorganisms and a time elapsed since delivery of the nutrient package.

6. The method of claim 1 wherein the movement of fluids is determined based upon a measurement of a concentration of the resident microorganisms.

7. The method of claim 1 wherein the movement of fluids is determined based upon a measurement of a change in cell morphology of the resident microorganisms.

8. The method of claim 1 wherein the nutrient package changes a function of the microorganisms.

9. The method of claim 1 wherein the direction, volume, and velocity of fluid flow are determined based upon changes in metabolites of the microorganisms.

10. The method of claim 1 wherein change in microorganisms is determined by laboratory microscopy and genetic sequencing.

11. The method of claim 1 wherein the rate, direction and flow pattern of the fluid are determined by comparing pre-treatment and post-treatment measurements.

12. The method of claim 1 further comprising the step of analyzing a sample from a well in the reservoir to determine the presence of microbial flora.

13. The method of claim 1 further comprising the step of sampling an injection well and at least one other well to detect changes in microbial morphology produced by the nutrient package.

14. The method of claim 1 further comprising the step of calculating transit time and rate from microorganism response parameters.

* * * * *